Patented May 26, 1942

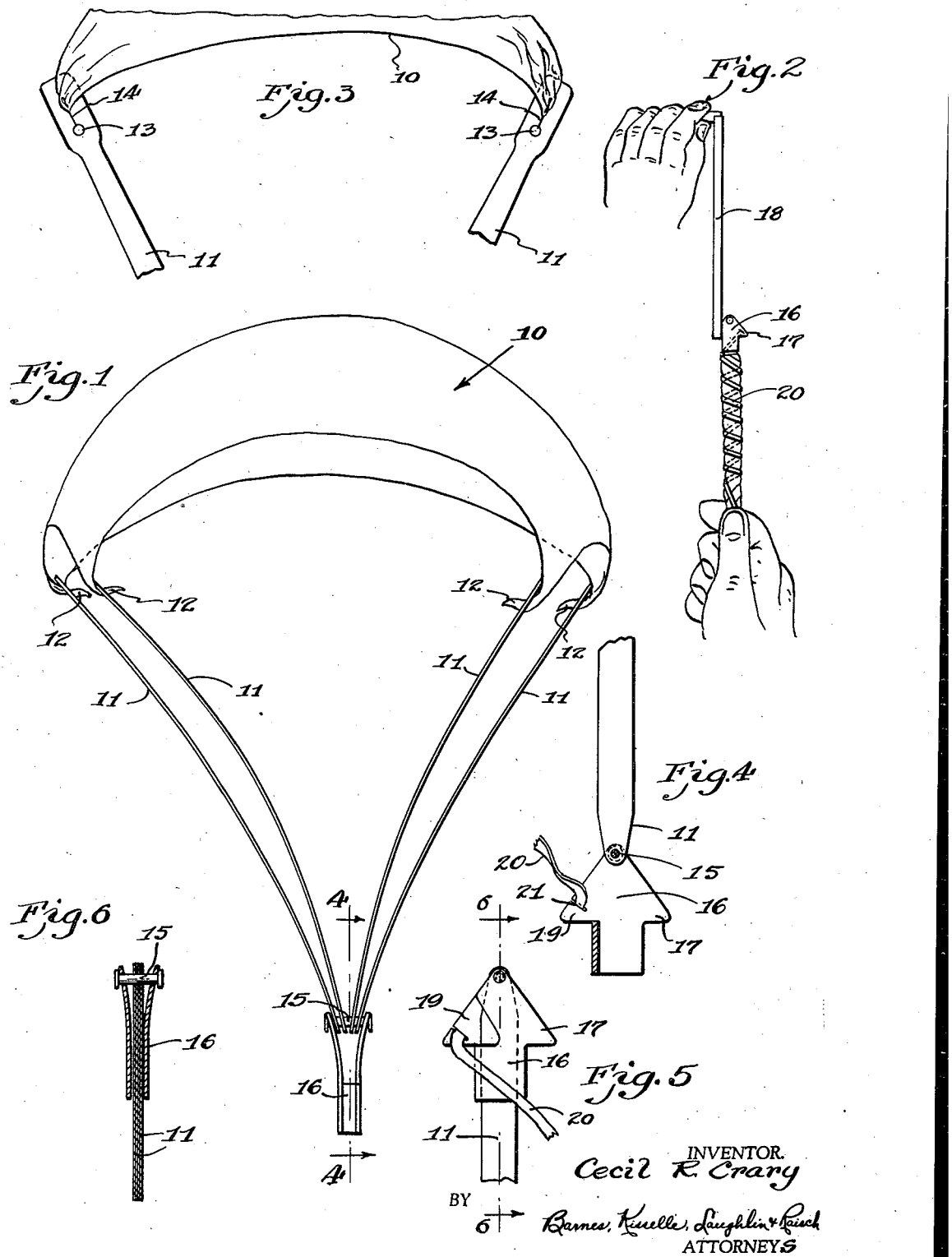

2,284,371

UNITED STATES PATENT OFFICE 2,284,371

PARACHUTE PROJECTILE

Cecil R. Crary, Detroit, Mich.

Application January 20, 1940, Serial No. 314,750

4 Claims. (Cl. 46—86)

This invention relates to a parachute of the type to be folded and projected rapidly skyward.

Previous parachute designs of this nature have included a parachute with stays and a housing for enclosing the elements of the combination so that the same could be forcefully projected skyward and being arranged to open at a certain point in its flight whereby the descent might be gradual.

It is an object of the present invention to provide a parachute toy having the features of the previous types in that it may be projected forcefully skyward and having a distinct advantage in that it needs no outer casing. It is a further object to provide semi-rigid stays for this parachute which will not become entangled and means for holding these stays at the projecting end whereby the same will be held in close parallel relation during the course of the flight and will be allowed to have free, loose movement during the parachute descent.

Another object of the invention is to provide a parachute which utilizes to its fullest extent the properties of latex or rubber sheet material which is used to form the parachute proper.

Other objects and features of the invention having to do with details of construction and operation, will be set forth in the following description and claims.

In the drawing:

Fig. 1 is a view of the parachute as it would appear in descent, with all of the elements being shown.

Fig. 2 is a view of the parachute ready for projected flight upward.

Fig. 3 is a partial view of the parachute showing the manner in which the parachute proper is connected to the stays.

Fig. 4 is a section taken on the lines 4—4 of Fig. 1.

Fig. 5 is a side elevation of a fastening and propelling means at the lower end of the stays.

Fig. 6 is a section taken on the lines 6—6 of Fig. 5.

The parachute proper consists of a sheet 10 of very thin rubber which is preferably formed from liquid latex. The sheet is preferably formed as a square member which is connected at each of its four corners to four stays 11. The corners 12 are drawn through a hole 13 in the ends of the stays as shown in Fig. 3 and after being stretched are drawn up into a slit 14 and released. They are thus firmly held.

The other ends of the stays are each pivoted on a pin 15 which passes through holes in the stays. The pin 15 lies transversely of a channel member 16 which is flared at one end as shown in Figs. 1 and 6. The pin is located at the flared end. The channel member is adapted to perform several functions. During the projected flight, it serves as a force receiving member for the assembly as shown in Fig. 2; this is by reason of a transverse extension 17 which permits an elastic band 18 to be hooked over. The channel member can be most attractively shaped in the form of an arrow as shown; one barb of the arrow serves as the transverse extension 17 and the other barb 19 serves as a basis for the location and fastening of an elastic tying and timing means 20. The end of the tying means is held in a slit 21 in the barb 19.

In Fig. 5, the channel member 16 is shown in its projected flight position. In this position, as shown in Fig. 6, the channel serves to maintain the stays 11 in close parallel relation. When the parachute is being prepared for flight, the stays are all arranged close together and the parachute proper 10 is folded and rolled neatly around the stays. The timing and tying means 20 is then wound around the assembly, as shown in Fig. 2, and is held by the thumb at the tail end of the device. It may then be projected upwardly and when the member 20 is unwrapped from the parachute proper, the resilience of the latex will cause the rolled parachute to expand and unfold. As the member 20 becomes loose and the parachute stays descend, the channel member 16 will point downwardly and its weight will pivot it in relation to the stays, to the position shown in Fig. 1. The flared end will then be up and will permit the stays to assume the positions shown. On the descent, of course, the channel member serves as the balancing weight.

The most desirable results have been obtained when the ends 12 of the parachute sheet are pulled inwardly through the holes 13 so that they all point toward the inside of the stays as shown in Fig. 1.

I claim:

1. A parachute projectile comprising a plurality of semi-rigid stays formed of flexible fibrous strips, a parachute sheet fastened at one end of each of said stays, and means at the other end of said stays arranged to maintain said stays in a predetermined relative order, said means comprising a channel member pivoted at the ends of said stays whereby said stays may lie in said channel and formed of a material which will serve as a weight for the descending parachute, and a transverse extension on said member to serve as a force receiving member.

2. A parachute projectile comprising a plurality of semi-rigid stays, means at one end of said stays serving to fasten the same and maintain the same in a predetermined relative order, said means comprising a short channel pivoted to said stays and adapted to serve as a weight for a descending parachute fastened at the other end of said stays, and an elastic strip fastened at one side of said channel and adapted to be wrapped around said parachute and stays when the same are folded together to hold the assembly as a compact unit during a portion of its flight.

3. A parachute projectile comprising a plurality of semi-rigid stays, a channel member at one end of said stays, a pivot passing through said channel member and through the end of said stays to maintain the stays in a predetermined relative order, and a parachute at the other end of said stays, said parachute being adapted to be wrapped around said stays when in parallel relation, and means for maintaining said assembly in a compact unit during a portion of its flight.

4. A parachute projectile comprising a plurality of semi-rigid stays, a channel member having a flared end at one end of said stays, a pivot passing through the flared end of said channel member and through the end of said stays to maintain the stays in a predetermined relative order, and a parachute at the other end of said stays when in parallel relation, and means for maintaining said assembly in a compact unit during a portion of its flight.

CECIL R. CRARY.